US006389040B1

(12) United States Patent
Viswanathan

(10) Patent No.: US 6,389,040 B1
(45) Date of Patent: May 14, 2002

(54) APPARATUS AND METHOD FOR GENERATING A FREQUENCY OFFSET ESTIMATE FOR COMMUNICATION SYSTEMS HAVING FREQUENCY SELECTING FADING CHANNELS

(75) Inventor: Harish Viswanathan, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/152,112

(22) Filed: Sep. 11, 1998

(51) Int. Cl.$^7$ ................................................. H04K 1/00
(52) U.S. Cl. ........................ 370/480; 370/295; 370/319; 455/136; 375/350
(58) Field of Search ................................. 370/203, 205, 370/210, 277, 290, 295, 319, 344, 480; 375/229, 230, 231, 232, 350, 355, 356, 357, 358, 362; 455/136, 137, 138

(56) References Cited

U.S. PATENT DOCUMENTS

| | | | | |
|---|---|---|---|---|
| 4,520,493 | A | | 5/1985 | Heard et al. ................... 375/97 |
| 5,150,380 | A | | 9/1992 | Okanoue ....................... 375/16 |
| 5,255,290 | A | | 10/1993 | Anvari .......................... 375/97 |
| 5,422,917 | A | | 6/1995 | Scott ............................ 375/371 |
| 5,499,268 | A | | 3/1996 | Takahashi .................... 375/231 |
| 5,537,443 | A | * | 7/1996 | Yoshino et al. ............. 375/340 |
| 5,563,888 | A | | 10/1996 | Parr et al. .................... 370/95.1 |
| 5,640,431 | A | * | 6/1997 | Bruckert et al. ............ 375/344 |
| 6,263,014 | B1 | * | 7/2001 | Chang et al. ................ 375/210 |

OTHER PUBLICATIONS

Sabel, A Maximum Likelihood Approach to Symbol Timing Recovery in Digital Communications, University of South Australia, pp. 1–196, 1993.*

Luise et al, Carrier Frequency Recovery in All–digital Modems for Burst–Mode Transmissions, IEEE, pp. 11169–1178, 1995.*

Marco Luise and Ruggero Reggiannini, "Carrier Frequency Recovery in All–Digital Modems for Burst–Mode Transmissions" IEEE Transactions On Communications, vol. 43, No. 2/3/4, Feb., Mar., Apr. 1995, pp. 1169–1.

Michael P. Fitz and William C. Lindsey, "Decision–Directed Burst–Mode Carrier Synchronization Techniques," IEEE Transactions On Communications, vol. 40, No. 10, Oct. 1992, pp. 1644–1653.

* cited by examiner

Primary Examiner—Wellington Chin
Assistant Examiner—Frank Duong
(74) Attorney, Agent, or Firm—Thomas Stafford

(57) ABSTRACT

A frequency offset estimation is generated without explicitly generating a channel estimation for a frequency selective fading communication channel. This is realized by recognizing that, in the absence of additive noise, the channel output at a time n depends only on the last previous predetermined number, L, of data symbols, and that a "state" is a sequence of the last L symbols. Specifically, in a receiver, a received signal is mixed with a locally generated frequency corresponding to a frequency offset to generate a mixed signal. A calculation is made on the mixed signal in which channel outputs of the same state are combined and accumulated. Then, a summation is made over all possible states of the combined and accumulated channel outputs to yield a so-called metric calculation value for that mixed signal. The metric calculation is then repeated for a plurality of different locally generated frequencies corresponding on a one-to-one basis with a plurality of frequency offsets. The frequency offset corresponding to the largest metric calculation value is selected as the desired frequency offset estimate. In one embodiment of the invention, a representation of a frequency offset estimation value is obtained by employing an open loop arrangement. In another embodiment of the invention, a frequency offset estimation value is generated by employing an closed loop arrangement.

39 Claims, 3 Drawing Sheets

300

APPARATUS AND METHOD FOR GENERATING A FREQUENCY OFFSET ESTIMATE FOR COMMUNICATION SYSTEMS HAVING FREQUENCY SELECTING FADING CHANNELS

TECHNICAL FIELD

This invention relates to communication systems and, more particularly, to burst communication systems.

BACKGROUND OF THE INVENTION

Communication channels, and particularly, wireless communication channels, are subject to channel impairments such as multipath propagation, i.e., spread, and fading, in addition, to additive noise. Carrier frequency offset that typically occurs because of transmitter and receiver oscillator mismatch in such systems is further compounded by Doppler shifts in mobile communication systems. Rapid frequency acquisition and tracking are crucial for accurate decoding of the information being received.

In receivers, frequency lock loops have typically been used to generate a carrier frequency offset estimate, which, in turn, is used to compensate a locally generated carrier frequency. However, in a burst communication system, e.g., a time division multiple-access (TDMA) system, in a fading environment, it may be required to used a so-called open loop offset frequency estimator based on a data burst preamble in order to avoid so-called "hang-up" effects. A frequency offset estimate may be required to be generated at the start of each burst before decoding the information. Rapid acquisition of the carrier frequency and, consequently, rapid generation of the carrier frequency offset, is required in burst communication systems because of the small number of training symbols available in the burst preamble. Additional known frequency acquisition techniques based on phase locked loops tend to have acquisition times longer than the duration of a burst. While there are open loop techniques for fast frequency or phase estimation, these estimation techniques generate estimates having a large variance in the presence of strong multipath spread. Adaptive equalizers, typically used in a multipath environment, are capable of adequately tracking small frequency offsets. However, with a large initial frequency offset the adaptive equalizer is incapable of tracking the frequency offset satisfactorily. Consequently, it is necessary to estimate the frequency offset and perform frequency correction before equalization.

A specific technique that has been proposed to generate frequency offset estimates is the so-called maximum likelihood estimation technique. This technique compensates for the phase changes caused in a received signal because of data modulation and generates an average over a number of symbols to remove the effect of noise. However, the maximum likelihood estimation technique fails in an environment including multipath spread because the received signal, due to data modulation, depends on more than one data symbol and, therefore, cannot be compensated by merely generating the conjugate of the training sequence, namely, $x(n)^*$.

Additionally, it is known that frequency offset estimation in a frequency selective fading channel can be obtained jointly with the channel estimation. However, adaptive equalizer coefficients that are used for canceling intersymbol interference are often obtained directly without generating an explicit channel estimation. Consequently, joint frequency offset estimation and channel estimation for such systems results in additional complexity that is not necessary.

SUMMARY OF THE INVENTION

These and other problems and limitations of prior known frequency offset estimation arrangements and techniques are addressed by generating a frequency offset estimation without explicitly generating a channel estimation for a frequency selective fading communication channel. This is realized by recognizing that, in the absence of additive noise, the channel output at a time n depends only on the last previous predetermined number, L, of data symbols, and that a "state" is a sequence of the last L symbols.

Specifically, in a receiver, a received signal is mixed with a locally generated frequency corresponding to a frequency offset to generate a mixed signal. A calculation is made on the mixed signal in which channel outputs of the same state are combined and accumulated. Then, a summation is made over all possible states of the combined and accumulated channel outputs to yield a so-called metric calculation value for that mixed signal. The metric calculation is then repeated for a plurality of different locally generated frequencies corresponding on a one-to-one basis with a plurality of frequency offsets. The frequency offset corresponding to the largest metric calculation value is selected as the desired frequency offset estimate.

In one embodiment of the invention, a representation of a frequency offset estimation value is obtained by employing an open loop arrangement. More specifically, the frequency offset estimation value is obtained by generating simultaneously a plurality of metric calculation values over a corresponding plurality of predetermined frequency values. This is realized by mixing an input signal with each of the plurality of predetermined frequency values to generate a corresponding plurality of mixed signals and, then, obtaining a separate metric calculation over each the mixed signals. The maximum metric calculation value is selected and the frequency offset estimate is the frequency that corresponds to the selected metric calculation value.

In another embodiment of the invention, a frequency offset estimation value is generated by employing a closed loop arrangement. The received signal is mixed with a frequency offset estimation value and employed in a metric calculation to yield an error signal. A filtered version of the error signal is used to control, in one example, a numerically controlled oscillator to generate the frequency offset estimation value. The metric calculation is made at both a positive step frequency from a frequency offset value and at a negative step frequency from the frequency offset value. The resulting metric calculation values are algebraically subtracted and filtered to yield the error signal.

DETAILED DESCRIPTION

A. Theoretical Discussion

1. Background

Figure 1:
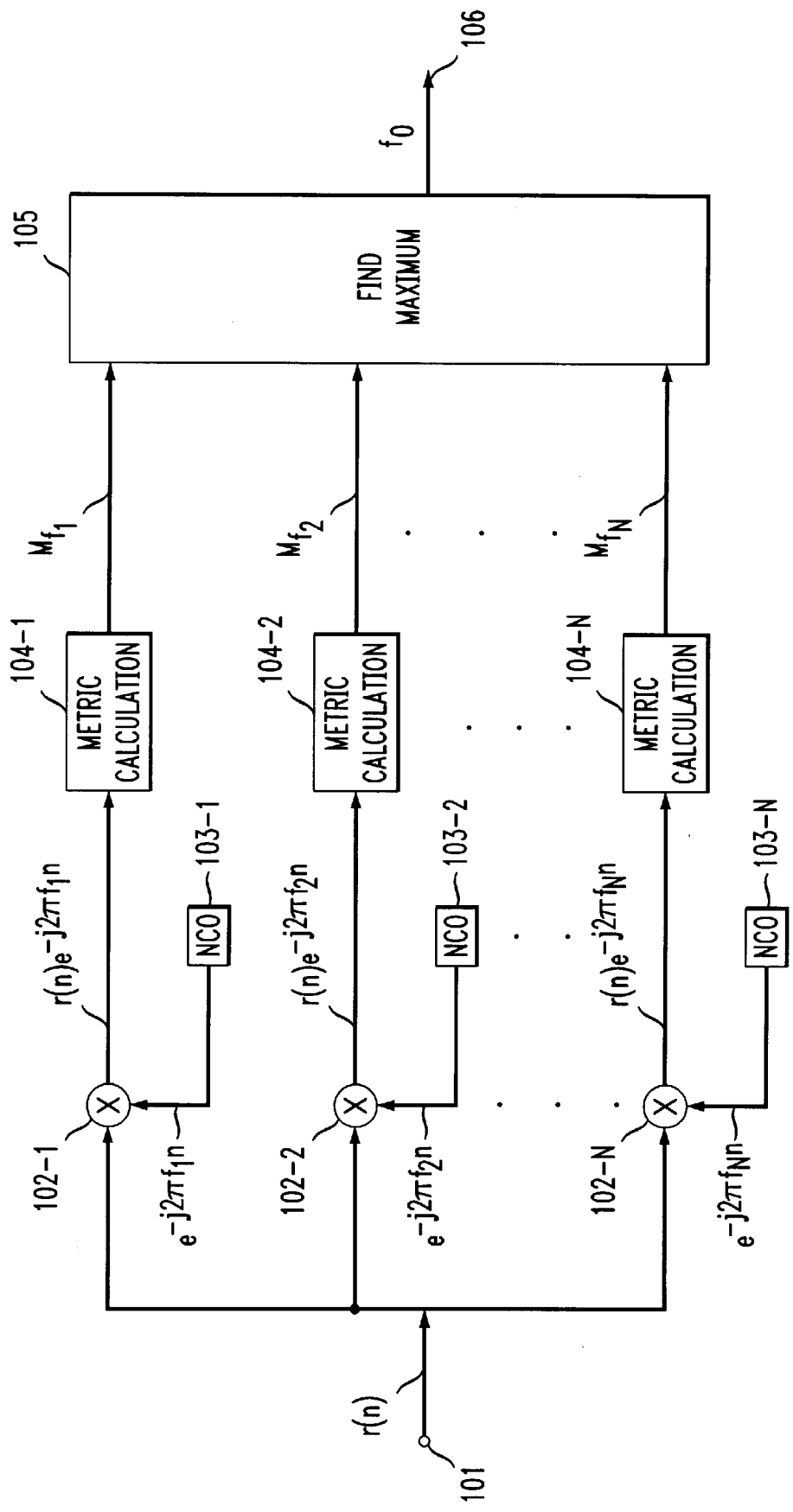
FIG. 1 shows, in simplified block diagram form, details of an open loop frequency offset estimator including an embodiment of the invention.

Consider a burst communication system having a preamble including N training symbols $\{x(n)\}_{n=0}^{N-1}$. The training symbols are assumed to be chosen at random from a binary signaling alphabet. We first consider an additive white complex Gaussian noise (AWGN) channel and, then, consider a frequency selective Ricean fading channel. Let $f_0$ be the frequency offset at a receiver. In the absence of any intersymbol interference a received signal r(n) is given by $$r(n) = x(n)e^{j2\pi f_0 n} + w(n) \qquad (1)$$

where w(n) is the additive white complex Gaussian noise. The log-likelihood is given by $$\Lambda(f_0) = -\sum_{n=0}^{N-1} |r(n) - x(n)e^{j2\pi f_0 n = \phi}|^2$$

and, hence, the maximum likelihood estimate $\hat{f}_0^{ML}$ is given by $$\hat{f}_0^{ML} = \arg\min_{\hat{f}_0}\min_{\phi} \sum_{n=0}^{N-1} |r(n) - x(n)e^{j2\pi \hat{f}_0 n + j\phi}|^2 \qquad (2)$$

$$= \arg\max_{\hat{f}_0}\max_{\phi} 2\,\text{Re}\left(\sum_{n=0}^{N-1} r(n)x(n)^* e^{-j2\pi \hat{f}_0 n - j\phi}\right)$$

$$= \arg\max_{\hat{f}_0} \left|\sum_{n=0}^{N-1} r(n)x(n)^* e^{-j2\pi \hat{f}_0 n}\right|,$$

where * is the conjugate. The above noted maximum likelihood estimator is consistent. The optimization involved in equation (2) can be implemented approximately by searching over a discrete set of frequency values:

$$\hat{f}_0^{ML} \approx \arg\max_{\{\hat{f}_0 | \hat{f}_0 = k\Delta f, k = -p, \cdots, 0 \cdots p\}} \left|\sum_{n=0}^{N-1} r(n)x(n)^* e^{-j2\pi \hat{f}_0 n}\right|,$$

where $\Delta f$ is the bin size that determines the resolution of the estimate and $[-p\Delta f, p\Delta f]$ is the range of possible frequency offsets. A tree search process is known for the efficient implementation of the above maximization.

Now consider a frequency selective block fading channel. Assume that the channel is changing sufficiently slowly that it is essentially static over the duration of the data burst and, in particular, during the preamble interval that is used for open loop frequency estimation. Let the symbol spaced channel impulse response be given by $\{h(k)\}_{k=0}^{L-1}$. Then, the received sampled signal is given by $$r(n) = \left(\sum_{k=0}^{L-1} x(n-k)h(k)e^{-j2\pi\Delta fk}\right)e^{j2\pi f_0 n} + w(n) \qquad (3)$$

For the Ricean fading frequency selective channel the direct path gain h(0) is Ricean distributed while the multipath gains h(k), $1 \leq k \leq L$ are Rayleigh distributed. The maximum likelihood estimator is not optimal in the presence of multipath spread. It can be shown that the maximum likelihood estimator performance at high signal-to-noise ratios (SNR) is seriously affected by intersymbol interference (ISI). At high SNRs, noise is no longer the limiting factor in the frequency estimation.

The maximum likelihood estimator in the presence of multipath spread can also be derived. The channel impulse response $\{h(k)\}$ is unknown at the receiver. The log likelihood $\Lambda(f_0, h)$ is given by $$\Lambda(f_0, h) = -\sum_{n=0}^{N-1} \left|r(n) - \left(\sum_{k=0}^{L-1} x(n-k)h(k)e^{-j2\pi f_0 k}\right)e^{j2\pi f_0 n}\right|^2 \qquad (4)$$

The maximum likelihood estimate of the carrier frequency offset is obtained by jointly maximizing the likelihood function over $f_0$ and h:

$$\hat{f}_0^{ML} = \arg\max_{f_0}\max_{h} \Lambda(f_0, h)$$

$$= \arg\min_{f_0}\min_{h} \sum_{n=0}^{N-1} \left|r(n) - \left(\sum_{k=0}^{L-1} x(n-k)h(k)e^{-j2\pi f_0 k}\right)e^{j2\pi f_0 n}\right|^2$$

However, the complexity of the maximum likelihood estimation prevents it from being used in practical systems.

2. Inventive Frequency Estimators

I have discovered a new carrier frequency offset estimator, namely, a maximum state-based accumulation (MSA) estimator. Motivation for the MSA estimator comes from an understanding of the maximum likelihood (ML) estimator in the absence of multipath spread. From equation (2) above, it is easy to see that the ML estimator compensates for the in phase changes in the received signal due to data modulation and averages over N symbols to remove the effect of noise. The ML estimator fails in a multipath spread scenario because the received signal phase due to data modulation depends on more than one data symbol and cannot be compensated for by merely multiplying by the conjugate of the training sequence, namely, $x(n)^*$.

While the channel impulse response is not known, it is known that the channel output at time n depends only on the past L data symbols. The training sequence can be associated with the state at each time n based on the past L data symbols. I define the state s(n) at time n to be s(n)=[x(n), x(n-1), ..., x(n-L+1)]. Then, assuming that the channel impulse response is of length L and that the training sequence is binary valued, there are $N_s = 2^L$ possible states. The received signal at time n depends only on the state s(n) (and not on n) and is given by $$r(n) = \left(\sum_{k=0}^{L-1} x(n-k)h(k)e^{-j2\pi f_0 k}\right)e^{j2\pi f_0 n} + w(n)$$

$$= \tilde{h}' s(n) e^{j2\pi f_0 n} + w(n),$$

where $\tilde{h}(k) = h(k)e^{-j2\pi f_0 k}$. Hence, it follows that $$E(r(n)e^{-j2\pi f_0 n} | s(n) = u) = \tilde{h}' u$$

$$= |\tilde{h}' u| e^{j\theta(u)}$$

for every state u and where E is the expectation. Note that the right side of the above equation is independent of the offset frequency $f_0$. Hence, $$\sum_u |E[r(n)e^{-j2\pi f_0 n} | s(n) = u]| = \sum_u |\tilde{h}' u|.$$

On the other hand for $\hat{f} \neq f_0$, $$\sum_{n:s(n)=u} E\left[r(n)e^{-j2\pi \hat{f}_0 n} \mid s(n)=u\right] = \tilde{h}'u \sum_{n:s9n)=u} e^{j2\pi(f_0-\hat{f}_0)n}$$
$$\approx 0$$

for a sufficiently long training sequence {s(n)}.

Then, the following frequency offset estimator is defined $$\hat{f}_0^{MSA} \triangleq \arg\max_{f_0} \sum_{s \in S} \left| \sum_{n=0, n:s(n)=s}^{N-1} r(n)e^{-j2\pi f_0 n} \right|, \quad (5)$$

where S is the set of all possible training sequences of L symbols. For binary training sequences $|S|=2^L$.

The optimization of the frequency offset estimator of equation (5) can be implemented approximately by determining the maximum $\hat{f}_0^{MSA}$ over a discrete set of frequency bins.

The frequency offset estimator of equation (5) is an open loop arrangement that requires the simultaneous computation of the frequency discrimination function at several values of the frequency. The frequency offset estimate is then ascertained by a maximum selection process.

A closed loop arrangement is also proposed that requires less computational effort than the open loop arrangement.

A necessary condition for the maximum in equation (5) to be achieved is that the derivative of the objective function be zero. This suggests that the following error signal can be employed to adjust the frequency of an oscillator in generating a carrier signal at the desired frequency:

$$e(\hat{f}_0) = \frac{\partial M(\hat{f}_0)}{\partial \hat{f}_0} \quad (6)$$
$$\approx \frac{M(\hat{f}_0 + \Delta f) - M(\hat{f}_0 - \Delta f)}{2\Delta f},$$

where $M(\hat{f})$ is defined to be the objective function in equation (5), namely, $$M(\hat{f}) = \sum_{s=0}^{2^L-1} \left| \sum_{n=0, n:s(n)=s}^{N-1} r(n)e^{-j2\pi f_0 n} \right|,$$

and $\Delta f$ is some fixed step size.

B. Embodiments of MSA Frequency Estimators

Figure 2:
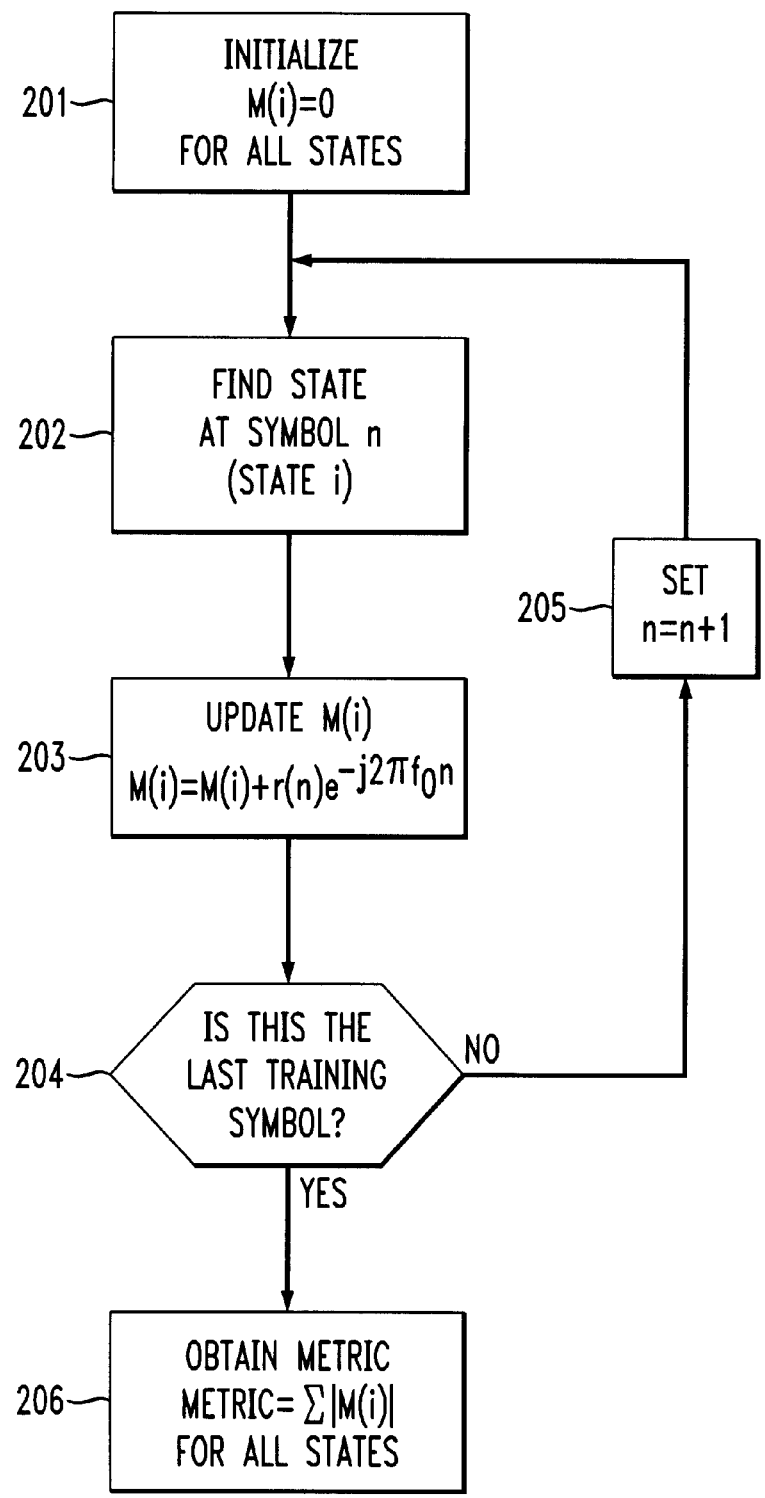
FIG. 2 is a flow chart illustrating the steps in the metric calculation process employed in the embodiments shown in FIGS. 1 and 3.

FIG. 1 shows, in simplified block diagram form, details of an open loop MSA frequency offset estimator 100. A received data signal r(n) is supplied to input 101 of a receiver and, therein, to one input of each of mixing units 102-1 through 102-N, e.g., multipliers. In this example, numerically controlled oscillators (NCOs) 103-1 through 103-N are employed to generate a corresponding plurality of N discrete frequencies, namely, $e^{-j2\pi f_1 n}$ through $e^{-j2\pi f_N n}$ respectively, which frequencies are supplied to a second input of the corresponding ones of mixing units 102-1 through 102-N, respectively. It should be noted any number of other types of oscillators may equally employed to generate the desired frequencies. The generated discrete frequencies are mixed with the received signal in mixers 102-1 through 102-N to yield $r(n)e^{-j2\pi f_1 n}$ through $r(n)e^{-j2\pi f_N n}$, respectively, which are supplied on a one-to-one basis to metric calculation units 104-1 through 104-N, respectively. Each of metric calculation units 104-1 through 104-N makes a metric calculation as shown in FIG. 2 and described below to generate metric calculation values $M_{f_1}$ through $M_{f_N}$, at corresponding frequencies $f_1$ through $f_N$, respectively. Metric calculation values $M_{f_1}$ through $M_{f_N}$ are supplied to find maximum unit 105, where the maximum one of metric calculation values $M_{f_1}$ through $M_{f_N}$ is selected and, then the frequency offset estimate $f_0$ corresponds to the frequency over which the selected metric calculation was made. Thus, as seen a plurality of N discrete metric calculation values $M_{f_1}$ through $M_{f_N}$ are generated simultaneously and the frequency $f_1$ through $f_N$ of the metric calculation having the maximum amplitude value is selected as the desired frequency offset estimate $f_0$.

Advantages of the embodiment of the invention shown in FIG. 1 are that its implementation is less complex and its frequency offset estimation accuracy is improved over prior known frequency estimators, for example, the maximum likelihood frequency estimator described above.

Figure 3:
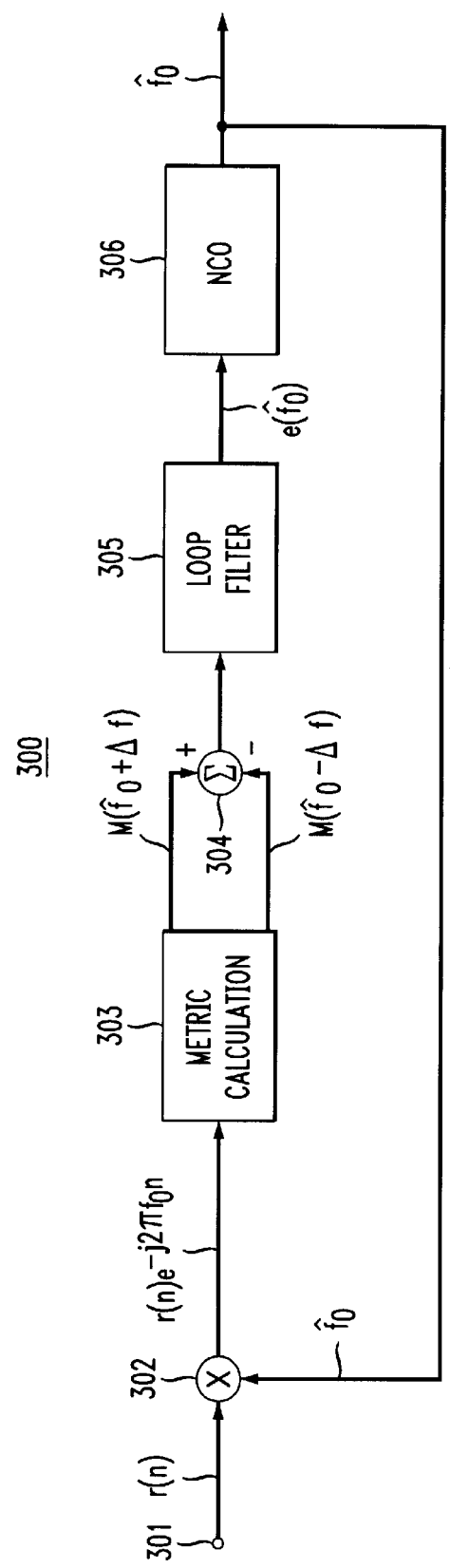
FIG. 3 shows, in simplified block diagram form, details of a closed loop frequency offset estimator including an embodiment of the invention.

FIG. 2 is a flow chart illustrating the steps in the metric calculation process employed in the embodiments shown in FIGS. 1 and 3. In FIG. 2, r(n) is the received signal, $f_0$ is the frequency offset at which the metric is calculated and M(i) is the metric corresponding to state "i". Thus, the metric calculation process starts in step 201 by initializing M(i)=0 for all states. Then, step 202 causes the state at symbol n to be found (say, state i). Thereafter, step 203 updates M(i), namely, setting $M(i)=M(i)+r(n)e^{-j2\pi f_0 n}$. This is the same as the inner summation in equation (5), namely $$\sum_{n=0, n:s(n)=s}^{N-1} r(n)e^{-j2\pi f_0 n}.$$

Step 204 tests to determine if all training symbols have been used. If the test result in step 204 control is supplied to step 205 and the training symbol is indexed, namely, it is set to n=n+1. Thereafter, control is returned to step 202 and steps 202 through 205 are iterated until step 204 yields a YES test result. Then, step 206 generates the desired metric at the particular frequency by summing all the |M(i)| for all states. This is the outer summation in equation (5), namely $$\sum_{s=0}^{2^L-1} \left| \sum_{n=0, n:s(n)=s}^{N-1} r(n)e^{-j2\pi f_0 n} \right|.$$

FIG. 3 shows, in simplified block diagram form, details of a closed loop frequency estimator 300 including an embodiment of the invention. A received signal r(n) is supplied via input 301 to one input of mixing unit 302. A representation of a desired frequency offset estimate $\hat{f}_0 = e^{-j2\pi \hat{f}_0 n}$ is supplied to a second input of mixing unit 302, where it is mixed with received signal r(n) to yield $r(n)e^{-j2\pi \hat{f}_0 n}$. In turn, $r(n)e^{-j2\pi \hat{f}_0 n}$ is supplied to metric calculation unit 303. Metric calculation 303 makes the same metric calculation as described above in relationship to FIG. 2, but does it twice, once for first frequency value $(\hat{f}_0 + \Delta f)$ and once for second frequency value $(\hat{f}_0 - \Delta f)$ to yield $M(\hat{f}_0 + \Delta f)$ and $M(\hat{f}_0 - \Delta f)$ respectively. As indicated above. $\Delta f$ is a predetermined step frequency value. In turn, $M(\hat{f}_0 + \Delta f)$ and $M(\hat{f}_0 - \Delta f)$ are supplied to algebraic combining unit 304 where they are algebraically subtracted. The result of the subtraction is supplied to loop filter 305 which yields error signal $e(\hat{f}_0)$. Error signal $e(\hat{f}_0)$, in this example, is used to control numerically controlled oscillator (NCO) 306 to generate the desired frequency offset estimate $\hat{f}_0$. The frequency offset estimate $\hat{f}_0$ is supplied as an output and to the second input of mixing unit 302. Thus, the carrier signal having the desired frequency is generated in this embodiment of the invention in accordance with equation (6) described above.

As in the embodiment shown in FIG. 1 and described above, advantages of the embodiment of the invention shown in FIG. 3 are that its implementation is less complex and its acquisition time for acquiring the carrier frequency is shorter than prior known frequency estimators, for example, the maximum likelihood frequency estimator described above.

What is claimed is:

1. Apparatus for use in a receiver to generate a frequency offset estimate in response to a received signal comprising:
   a plurality of oscillators for generating a plurality of frequency signals each having a its own respective frequency;
   a plurality of mixing units, each mixing unit being supplied with said received signal and on a one-to-one basis with a corresponding one of said plurality of frequency signals for generating a mixed signal which is a version of said received signal multiplied by said corresponding one of said plurality of frequency signals;
   a plurality of metric calculation units, each metric calculation unit being supplied with one of said mixed signals for generating a metric value at the frequency of said supplied mixed signal in accordance with prescribed criteria including obtaining a first sum $$\sum_{n=0, n: s(n)=s}^{N-1} r(n) e^{-j2\pi f_0 n}$$

and obtaining a second sum $$\sum_{s=0}^{2^L-1} \left| \sum_{n=0, n: s(n)=s}^{N-1} r(n) e^{-j2\pi f_0 n} \right|,$$

where r(n) is said received signal, s(n) is a state, L is a number of fast data symbols, N is a number of discrete frequencies, n is a time, $e^{-j2\pi f_0 n}$ is a discrete frequency and $f_0$ is one of $f_1$ through $f_N$, said plurality of metric calculation units thereby generating a metric calculation over each of said plurality of frequencies; and
   an apparatus supplied with said plurality of metric calculations for selecting a metric calculation having a maximum magnitude, wherein the frequency over which said metric calculation having the maximum magnitude was made is the frequency offset estimate.

2. The invention as defined in claim 1 wherein said plurality of oscillators generates a corresponding plurality of discrete frequencies.

3. The invention as defined in claim 2 wherein each of said plurality of oscillators generates one of said discrete frequencies and wherein said discrete frequencies are $e^{-j2\pi f_1 n}$ through $e^{-j2\pi f_N n}$, where N is a number of discrete frequencies and n is a time.

4. The invention as defined in claim 2 wherein said received signal is r(n), said discrete frequencies are $e^{-j2\pi f_1 n}$ through $e^{-j2\pi f_N n}$ and said plurality of mixed signals includes $r(n) e^{-j2\pi f_1 n}$ through $r(n) e^{-j2\pi f_N n}$, where N is a number of discrete frequencies and n is a time.

5. Apparatus for use in a receiver to generate a frequency offset estimate in response to a received signal comprising:
   a plurality of oscillators for generating a plurality of discrete frequency signals each having a its own respective discrete frequency;
   a plurality of mixing units, each mixing unit being supplied with said received signal and on a one-to-one basis with a corresponding one of said plurality of discrete frequency signals for generating a mixed signal which is a version of said received signal multiplied by said corresponding one of said plurality of discrete frequency signals;
   a plurality of metric calculation units, each metric calculation unit being supplied with one of said mixed signals for generating a metric value at the discrete frequency of said supplied mixed signal in accordance with prescribed criteria, each of said metric calculations being made over said supplied mixed signal and wherein each of said metric calculation units includes a combiner for combining channel outputs of the same state and an accumulator for accumulating the combined outputs of the same state over all possible states, where a state s(n) at time n is defined as s(n)=[x(n), x(n−1), . . . , x(n−L+1)] and L is a number of past data symbols, said plurality of metric calculation units thereby generating a metric calculation over each of said plurality of discrete frequencies; and
   an apparatus supplied with said plurality of metric calculations for selecting a metric calculation having a maximum magnitude, wherein the frequency over which said metric calculation having the maximum magnitude was made is the frequency offset estimate.

6. The invention as defined in claim 5 wherein said received signal is r(n), said discrete frequencies are $e^{-j2\pi f_1 n}$ through $e^{-j2\pi f_N n}$ and said plurality of mixed signals includes $r(n) e^{-j2\pi f_1 n}$ through $r(n) e^{-j2\pi f_N n}$, where N is a number of discrete frequencies and n is a time.

7. The invention as defined in claim 6 wherein said combiner includes a first summer for obtaining $$\sum_{n=0, n: s(n)=s}^{N-1} r(n) e^{-j2\pi f_0 n}$$

and said accumulator includes a second summer for obtaining $$\sum_{s=0}^{2^L-1} \left| \sum_{n=0, n: s(n)=s}^{N-1} r(n) e^{-j2\pi f_0 n} \right|,$$

were $f_0$ is one of $f_1$ through $f_N$.

8. Apparatus for use in a receiver to generate a frequency offset estimate in response to a received signal comprising:
   means for generating a plurality of frequency signals each having its own respective frequency;
   a plurality of means each for mixing said received signal and on a one-to-one basis with a corresponding one of said plurality of frequency signals for generating a mixed signal which is a version of said received signal multiplied by said corresponding one of said plurality of frequency signals;
   a plurality of means each for making a metric calculation over one of said mixed signals in accordance with prescribed criteria including obtaining a first sum $$\sum_{n=0, n: s(n)=s}^{N-1} r(n) e^{-j2\pi f_0 n}$$

and obtaining a second sum $$\sum_{s=0}^{2^L-1} \left| \sum_{n=0, n: s(n)=s}^{N-1} r(n) e^{-j2\pi f_0 n} \right|,$$

where r(n) is said received signal, s(n)is a state, L is a number of fast data symbols, N is a number of discrete frequencies, n is a time, $e^{-j2\pi f_0 n}$ is a discrete frequency and $f_0$ is one of $f_1$ through $f_N$ each of said means for making a metric calculation generating a metric calculation over a corresponding one of said plurality of frequencies; and means supplied with said plurality of metric calculations for selecting a metric value calculation having a maximum magnitude, wherein the frequency over which said metric calculation having the maximum magnitude was made is the frequency offset estimate.

9. The invention as defined in claim 8 wherein said plurality of oscillators generates a corresponding plurality of discrete frequencies.

10. The invention as defined in claim 9 wherein each of said plurality of oscillators generates one of said discrete frequencies and wherein said discrete frequencies are $e^{-j2\pi f_1 n}$ through $e^{-j2\pi f_N n}$, where N is a number of discrete frequencies and n is a time.

11. The invention as defined in claim 9 wherein said received signal is r(n), said discrete frequencies are $e^{-j2\pi f_1 n}$ through $e^{-j2\pi f_N n}$ and said plurality of mixed signals includes $r(n)e^{-j2\pi f_1 n}$ through $r(n)e^{-j2\pi f_N n}$, where N is a number of discrete frequencies and n is a time.

12. Apparatus for use in a receiver to generate a frequency offset estimate in response to a received signal comprising:
  means for generating a plurality of discrete frequency signals each having its own respective discrete frequency;
  a plurality of means each for mixing said received signal and on a one-to-one basis with a corresponding one of said plurality of discrete frequency signals for generating a mixed signal which is a version of said received signal multiplied by said corresponding one of said plurality of discrete frequency signals;
  a plurality of means each for making a metric calculation over a supplied one of said mixed signals in accordance with prescribed criteria, each of said means for making a metric calculation generating a metric calculation over a corresponding one of said plurality of discrete frequencies, each of said plurality of means for making said metric calculation includes a means for combining channel outputs of the same state and means for accumulating the combined outputs of the same state over all possible states, where a state s(n) at time n is defined as s(n)=[x(n),x(n−1), . . . , x(n−L+1)] and L is a number of past data symbols; and
  means supplied with said plurality of metric calculations for selecting a metric value calculation having a maximum magnitude, wherein the frequency over which said metric calculation having the maximum magnitude was made is the frequency offset estimate.

13. The invention as defined in claim 12 wherein said received signal is r(n), said discrete frequencies are $e^{-j2\pi f_1 n}$ through $e^{-j2\pi f_N n}$ and said plurality of mixed signals includes $r(n)e^{-j2\pi f_1 n}$ through $r(n)e^{-j2\pi f_N n}$, where N is a number of discrete frequencies and n is a time.

14. The invention as defined in claim 13 wherein said means for combining includes first summer means for obtaining $$\sum_{n=0, n: s(n)=s}^{N-1} r(n) e^{-j2\pi f_0 n}$$

and said means for accumulating includes second summer means for obtaining $$\sum_{s=0}^{2^L-1} \left| \sum_{n=0, n: s(n)=s}^{N-1} r(n) e^{-j2\pi f_0 n} \right|,$$

where $f_0$ is one of $f_1$ through $f_N$.

15. A method for use in a receiver including to generate a frequency offset estimate in response to a received signal comprising the steps of:
  generating a plurality of frequency signals each having its own respective frequency;
  mixing said received signal with said plurality of frequency signals on a one-to-one basis for generating a plurality of mixed signals, each of said mixed signals being a version of said received signal multiplied by a corresponding one of said plurality of frequency signals;
  making a plurality of metric calculations, each metric calculation being of one of said mixed signals for generating a metric value over the frequency of said supplied mixed signal in accordance with prescribed criteria including obtaining a first sum $$\sum_{n=0, n: s(n)=s}^{N-1} r(n) e^{-j2\pi f_0 n}$$

and obtaining a second sum $$\sum_{s=0}^{2^L-1} \left| \sum_{n=0, n: s(n)=s}^{N-1} r(n) e^{-j2\pi f_0 n} \right|,$$

where r(n) is said received signal, s(n)is a state, L is a number of fast data symbols, N is a number of discrete frequencies, n is a time, $e^{-j2\pi f_0 n}$ is a discrete frequency and $f_0$ is one of $f_1$ through $f_N$ wherein a metric calculation is generated over each of said plurality frequencies; and selecting a metric calculation having a maximum magnitude, wherein the frequency over which said metric calculation having the maximum magnitude was made is the desired frequency offset estimate.

16. The method as defined in claim 15 wherein said step of generating a plurality of frequencies generates a corresponding plurality of discrete frequencies.

17. The method as defined in claim 16 wherein said discrete frequencies are $e^{-j2\pi f_1 n}$ through $e^{-j2\pi f_N n}$, where N is a number of discrete frequencies and n is a time.

18. The method as defined in claim 16 wherein said received signal is r(n), said discrete frequencies are $e^{-j2\pi f_1 n}$ through $e^{-j2\pi f_N n}$ and said plurality of mixed signals includes $r(n)e^{-j2\pi f_1 n}$ through $r(n)e^{-j2\pi f_N n}$, where N is a number of discrete frequencies and n is a time.

19. A method for use in a receiver to generate a frequency offset estimate in response to a received signal comprising the steps of:
   generating a plurality of frequency signals each having its own respective discrete frequency;
   mixing said received signal with said plurality of discrete frequency signals on a one-to-one basis for generating a plurality of mixed signals, each of said mixed signals being a version of said received signal multiplied by a corresponding one of said plurality of discrete frequency signals;
   making a plurality of metric calculations, each metric calculation being over a supplied one of said mixed signals for generating a metric value over the frequency of said supplied mixed signal in accordance with prescribed criteria, wherein a metric calculation is generated over each of said plurality of discrete frequencies, each of said metric calculations including combining channel outputs of the same state and accumulating the combined outputs of the same state over all possible states, where a state s(n) at time n is defined as s(n)=[x(n),x(n−1), . . . , x(n−L+1)] and L is a number of past data symbols; and
   selecting a metric calculation having a maximum magnitude, wherein the frequency over which said metric calculation having the maximum magnitude was made is the desired frequency offset estimate.

20. The method as defined in claim 19 wherein said received signal is r(n), said discrete frequencies are $e^{-j2\pi f_1 n}$ through $e^{-j2\pi f_N n}$ and said plurality of mixed signals includes $r(n)e^{-j2\pi f_1 n}$ through $r(n)e^{-j2\pi f_N n}$, where N is a number of discrete frequencies and n is a time.

21. The method as defined in claim 20 wherein said step of combining includes obtaining a first sum $$\sum_{n=0, n:s(n)=s}^{N-1} r(n)e^{-j2\pi f_0 n}$$

and said step of accumulating includes obtaining a second sum $$\sum_{s=0}^{2^L-1} \left| \sum_{n=0, n:s(n)=s}^{N-1} r(n)e^{-j2\pi f_0 n} \right|,$$

where $f_0$ is one of $f_1$ through $f_N$.

22. Apparatus for use in a receiver to generate a frequency offset estimate in response to a received signal comprising:
   a controllable oscillator being responsive to an error signal for generating a frequency signal having a predetermined frequency;
   a mixing unit being supplied with said received signal and said frequency signal for generating a mixed signal which is a version of said received signal multiplied by said frequency signal;
   a metric calculation unit being supplied with said mixed signal for generating a first metric value at the frequency of said supplied mixed signal plus an incremental frequency value and for generating a second metric value at the frequency of said supplied mixed signal minus an incremental frequency value in accordance with prescribed criteria for obtaining each of said first and second metric values including obtaining a first sum $$\sum_{n=0, n:s(n)=s}^{N-1} r(n)e^{-j2\pi f_0 n}$$

and obtaining a second sum $$\sum_{s=0}^{2^L-1} \left| \sum_{n=0, n:s(n)=s}^{N-1} r(n)e^{-j2\pi f_0 n} \right|,$$

where r(n) is said received signal, s(n) is a state, L is a number of past data symbols, N is a number of discrete frequencies, n is a time, $e^{-j2\pi f_0 n}$ is a discrete frequency, $f_0 = \hat{f}_0 + \Delta f$ to obtain said first metric value and $f_0 = \hat{f}_0 - \Delta f$ to obtain said second metric value;
   an algebraic combiner for algebraically subtracting said second metric value from said first metric value to generate a difference signal; and
   a filter supplied with said difference signal for yielding said error signal.

23. The invention as defined in claim 22 wherein said oscillator generates a discrete frequency $e^{-j2\pi f_0 n}$, where n is a time.

24. The invention as defined in claim 23 wherein said received signal is r(n), and wherein said mixing unit generates a mixed signal $r(n)e^{-j2\pi f_{01} n}$.

25. Apparatus for use in a receiver to generate a frequency offset estimate in response to a received signal comprising:
   a controllable oscillator being responsive to an error signal for generating a discrete frequency signal having a predetermined discrete frequency $e^{-j2\pi f_0 n}$, where n is a time;
   a mixing unit being supplied with said received signal and said discrete frequency signal for generating a mixed signal which is a version of said received signal multiplied by said discrete frequency signal;
   a metric calculation unit being supplied with said mixed signal for generating a first metric value at the discrete frequency of said supplied mixed signal plus an incremental frequency value and for generating a second metric value at the discrete frequency of said supplied mixed signal minus an incremental frequency value in accordance with prescribed criteria, said metric calculation unit including a combiner for combining channel outputs of the same state and an accumulator for accumulating the combined outputs of the same state over all possible states, where a state s(n) at time n is defined as s(n)=[x(n),x(n−1), . . . , x(n−L+1)] and L is a number of past data symbols;
   an algebraic combiner for algebraically subtracting said second metric value from said first metric value to generate a difference signal; and
   a filter supplied with said difference signal for yielding said error signal.

26. The invention as defined in claim 25 wherein said received signal is r(n), said discrete frequency is $e^{-j2\pi f_0 n}$ and said mixed signal is $r(n)e^{-j2\pi f_{01} n}$.

27. The invention as defined in claim 26 wherein said combiner includes a first summer for obtaining $$\sum_{s=0}^{2^L-1}\left|\sum_{n=0,n:s(n)=s}^{N-1} r(n)e^{-j2\pi f_0 n}\right|,$$

and said accumulator includes a second summer for obtaining $$\sum_{s=0}^{2^L-1}\left|\sum_{n=0,n:s(n)=s}^{N-1} r(n)e^{-j2\pi f_0 n}\right|,$$

wherein $f_0=\hat{f}_0+\Delta f$ to obtain said first metric value and $f_0=\hat{f}_0-\Delta f$ to obtain said second metric value.

28. Apparatus for use in a receiver in response to a received signal to generate a frequency offset estimate comprising:

controllable means being responsive to an error signal for generating a frequency signal having a predetermined frequency;

means being supplied with a received signal and said frequency signal for generating a mixed signal which is a version of said received signal multiplied by said frequency signal;

means being supplied with said mixed signal for generating a first metric value at the frequency of said supplied mixed signal plus an incremental frequency value and for generating a second metric value at the frequency of said supplied mixed signal minus an incremental frequency value in accordance with prescribed criteria for obtaining each of said first and second metric values including obtaining a first sum $$\sum_{n=0,n:s(n)=s}^{N-1} r(n)e^{-j2\pi f_0 n}$$

and obtaining a second sum $$\sum_{s=0}^{2^L-1}\left|\sum_{n=0,n:s(n)=s}^{N-1} r(n)e^{-j2\pi f_0 n}\right|,$$

where $r(n)$ is said received signal, $s(n)$ is a state, L is a number of past data symbols, N is a number of discrete frequencies, n is a time, $e^{-j2\pi f_0 n}$ is a discrete frequency, $f_0=\hat{f}_0+\Delta f$ to obtain said first metric value and $f_0=\hat{f}_0'\Delta f$ to obtain said second metric value;

means for algebraically subtracting said second metric value from said first metric value to generate a difference signal; and means for filtering said difference signal to yield said error signal.

29. The invention as defined in claim 28 wherein said controllable means generates a frequency signal having a discrete frequency $e^{-j2\pi f_0 n}$, where n is a time.

30. The invention as defined in claim 29 wherein said received signal is $r(n)$, and wherein said means for mixing generates a mixed signal $r(n)e^{-j2\pi f_{01} n}$.

31. Apparatus for use in a receiver to generate a frequency offset estimate in response to a received signal comprising:

controllable means being responsive to an error signal for generating a discrete frequency signal having a predetermined discrete frequency $e^{-j2\pi f_0 n}$, where n is a time;

means being supplied with a received signal and said discrete frequency signal for generating a mixed signal which is a version of said received signal multiplied by said discrete frequency signal;

means being supplied with said mixed signal for generating a first metric value at the discrete frequency of said supplied mixed signal plus an incremental frequency value and for generating a second metric value at the discrete frequency of said supplied mixed signal minus an incremental frequency value in accordance with prescribed criteria, said means for generating said first and second metric values including means for combining channel outputs of the same state and means for accumulating the combined outputs of the same state over all possible states, where a state $s(n)$ at time n is defined as $s(n)=[x(n),x(n-1),\ldots,x(n-L+1)]$ and L is a number of past data symbols;

means for algebraically subtracting said second metric value from said first metric value to generate a difference signal; and means for filtering said difference signal to yield said error signal.

32. The invention defined in claim 31 wherein said received signal is $r(n)$, said discrete frequency is $e^{-j2\pi f_0 n}$ and said mixed signal is $r(n)e^{-j2\pi f_{01} n}$.

33. The invention as defined in claim 32 wherein said means for combining includes first means summing to obtaining $$\sum_{n=0,n:s(n)=s}^{N-1} r(n)e^{-j2\pi f_0 n}$$

and said means for accumulating includes second means for summing to obtain $$\sum_{s=0}^{2^L-1}\left|\sum_{n=0,n:s(n)=s}^{N-1} r(n)e^{-j2\pi f_0 n}\right|,$$

where $f_0=\hat{f}_0+\Delta f$ to obtain said first metric value and where $f_0=\hat{f}_0-\Delta f$ to obtain said second metric value.

34. A method for use in a receiver to generate a frequency offset estimate in response to a received signal comprising the steps of:

controllably generating a frequency signal having a predetermined frequency;

generating a mixed signal which is a version of said received signal multiplied by said frequency signal;

generating a first metric value at the frequency of said supplied mixed signal plus an incremental frequency value in accordance with prescribed criteria for obtaining each of said first and second metric values including obtaining a first sum $$\sum_{n=0,n:s(n)=s}^{N-1} r(n)e^{-j2\pi f_0 n}$$

and obtaining a second sum $$\sum_{s=0}^{2^L-1}\left|\sum_{n=0,n:s(n)=s}^{N-1} r(n)e^{-j2\pi f_0 n}\right|,$$

where r(n) is said received signal, s(n) is a state, L is a number of past data symbols, N is a number of discrete frequencies, n is a time, $e^{-j2\pi f_0 n}$ is a discrete frequency, $f_0=\hat{f}_0+\Delta f$ to obtain said first metric value and $f_0=\hat{f}_0-\Delta f$ to obtain said second metric value;

generating a second metric value at the frequency of said supplied mixed signal minus an incremental frequency value in accordance with prescribed criteria;

algebraically subtracting said second metric value from said first metric value to generate a difference signal; and filtering said difference signal to yield said error signal.

35. The method as defined in claim 34 wherein said step of controllably generating generates a frequency signal having a discrete frequency $e^{-j2\pi f_0 n}$, where n is a time.

36. The method as defined in claim 35 wherein said received signal is r(n), and wherein said step of mixing generates a mixed signal $r(n)e^{-j2\pi f_{01} n}$.

37. A method for use in a receiver to generate a frequency offset estimate in response to a received signal comprising the steps of:

controllably generating a frequency signal having a predetermined frequency;

generating a mixed signal which is a version of said received signal multiplied by said frequency signal;

generating a first metric value at the frequency of said supplied mixed signal plus an incremental frequency value in accordance with prescribed criteria;

generating a second metric value at the frequency of said supplied mixed signal minus an incremental frequency value in accordance with prescribed criteria;

algebraically subtracting said second metric value from said first metric value to generate a difference signal; and filtering said difference signal to yield said error signal, each of said steps of generating said first and second metric values includes combining channel outputs of the same state and a step of accumulating the combined outputs of the same state over all possible states, where a state s(n) at time n is defined as s(n)=[x(n),x(n−1), . . . , x(n−L+1)] and L is a number of past data symbols.

38. The method as defined in claim 37 wherein said received signal is r(n), said discrete frequency is $e^{-j2\pi f_0 n}$ and said mixed signal is $r(n)e^{-j2\pi f_{01} n}$.

39. The method as defined in claim 38 wherein said step of combining to obtain said first metric value includes a first summing to obtain $$\sum_{n=0,n:s(n)=s}^{N-1} r(n)e^{-j2\pi f_0 n}$$

and said step of accumulating includes a second summing to obtain $$\sum_{s=0}^{2^L-1}\left|\sum_{n=0,n:s(n)=s}^{N-1} r(n)e^{-j2\pi f_0 n}\right|,$$

where $f_0=\hat{f}_0+\Delta f$, and to obtain said second metric value includes a first summing to obtain $$\sum_{n=0,n:s(n)=s}^{N-1} r(n)e^{-j2\pi f_0 n}$$

and said step of accumulating includes a second summing to obtain $$\sum_{s=0}^{2^L-1}\left|\sum_{n=0,n:s(n)=s}^{N-1} r(n)e^{-j2\pi f_0 n}\right|,$$

where $f_0=\hat{f}_0-\Delta f$.

* * * * *